US008621056B2

(12) United States Patent
Coussemaeker et al.

(10) Patent No.: US 8,621,056 B2
(45) Date of Patent: Dec. 31, 2013

(54) ENABLING PLURAL COMPUTING DEVICES TO COMMUNICATE USING A MASTER ACCOUNT

(75) Inventors: Didier M. Coussemaeker, Seattle, WA (US); Graham A. Wheeler, Redmond, WA (US); Nicolas Mai, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 12/958,426

(22) Filed: Dec. 2, 2010

(65) Prior Publication Data

US 2012/0143978 A1 Jun. 7, 2012

(51) Int. Cl.
*G06F 15/173* (2006.01)

(52) U.S. Cl.
USPC ......................................................... 709/223

(58) Field of Classification Search
USPC ......................................................... 709/223
See application file for complete search history.

(56) References Cited

U.S. PATENT DOCUMENTS

| 7,136,651 | B2 * | 11/2006 | Kalavade | 455/445 |
|---|---|---|---|---|
| 7,269,251 | B1 | 9/2007 | Jokinen | |
| 7,295,540 | B2 | 11/2007 | Joong et al. | |
| 7,312,711 | B2 | 12/2007 | Fong et al. | |
| 7,430,217 | B2 * | 9/2008 | Kuhl et al. | 370/455 |
| 7,516,168 | B2 * | 4/2009 | LeCrone et al. | 1/1 |
| 7,733,822 | B2 | 6/2010 | Gidwani | |
| 7,787,381 | B2 * | 8/2010 | Small et al. | 370/237 |
| 2004/0205244 | A1 * | 10/2004 | Marsico et al. | 709/245 |
| 2005/0083846 | A1 | 4/2005 | Bahl | |
| 2007/0141988 | A1 * | 6/2007 | Kuehnel et al. | 455/41.2 |
| 2007/0264991 | A1 * | 11/2007 | Jones et al. | 455/420 |
| 2008/0307501 | A1 * | 12/2008 | Marsico et al. | 726/3 |
| 2009/0093248 | A1 | 4/2009 | Srinivasan | |
| 2009/0240781 | A1 * | 9/2009 | Otsuka | 709/208 |
| 2009/0286531 | A1 | 11/2009 | Bhatt et al. | |
| 2009/0299788 | A1 * | 12/2009 | Huber et al. | 705/7 |
| 2010/0052857 | A1 * | 3/2010 | Ozeki et al. | 340/10.1 |
| 2010/0077094 | A1 * | 3/2010 | Howarter et al. | 709/231 |
| 2010/0296446 | A1 * | 11/2010 | Zhang et al. | 370/328 |
| 2011/0009122 | A1 * | 1/2011 | Kalavade | 455/445 |

(Continued)

OTHER PUBLICATIONS

Gordon, et al., "Integration of WWAN and WLAN in Hot-Spots," retrieved at <<http://www.sandilands.info/sgordon/doc/gordon2006-integration.pdf>> retrieved on Sep. 14, 2010, Proceedings of the First International Conference on Next-Generation Wireless Systems, 2006, 5 pages.

*Primary Examiner* — Alicia Baturay
(74) *Attorney, Agent, or Firm* — The Law Office of Michael E. Kondoudis

(57) ABSTRACT

Functionality is described that allows plural computing devices to share a master account. In one implementation, the functionality allows any candidate device to directly communicate with a communication system using the master account, providing that the candidate device satisfies a prescribed condition with respect to a master device. For example, the functionality can allow the candidate device to communicate with the communication system if it is within a threshold distance of the master device. In another implementation, the functionality instructs the master device and the candidate device to set up a tethering relationship. The functionality can then allow the candidate device to communicate with the communication system, via the master device, using the master account. In one implementation, the functionality can set up the tethering relationship without substantial (or any) involvement of the user (or users) who operate the master device and candidate device.

21 Claims, 12 Drawing Sheets

(56) References Cited

U.S. PATENT DOCUMENTS

| | | | |
|---|---|---|---|
| 2011/0286437 A1* | 11/2011 | Austin et al. | 370/338 |
| 2011/0294502 A1* | 12/2011 | Oerton | 455/426.1 |
| 2012/0025974 A1* | 2/2012 | Richey et al. | 340/539.13 |
| 2012/0025975 A1* | 2/2012 | Richey et al. | 340/539.13 |
| 2012/0025976 A1* | 2/2012 | Richey et al. | 340/539.13 |
| 2012/0030727 A1* | 2/2012 | Malik | 725/151 |
| 2012/0079018 A1* | 3/2012 | Rottler et al. | 709/204 |
| 2012/0096121 A1* | 4/2012 | Hao et al. | 709/219 |

* cited by examiner

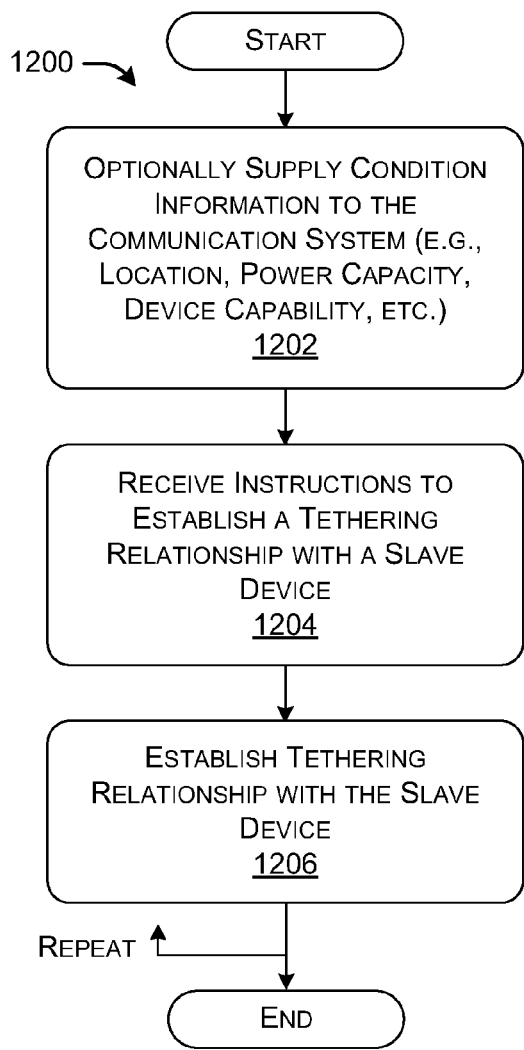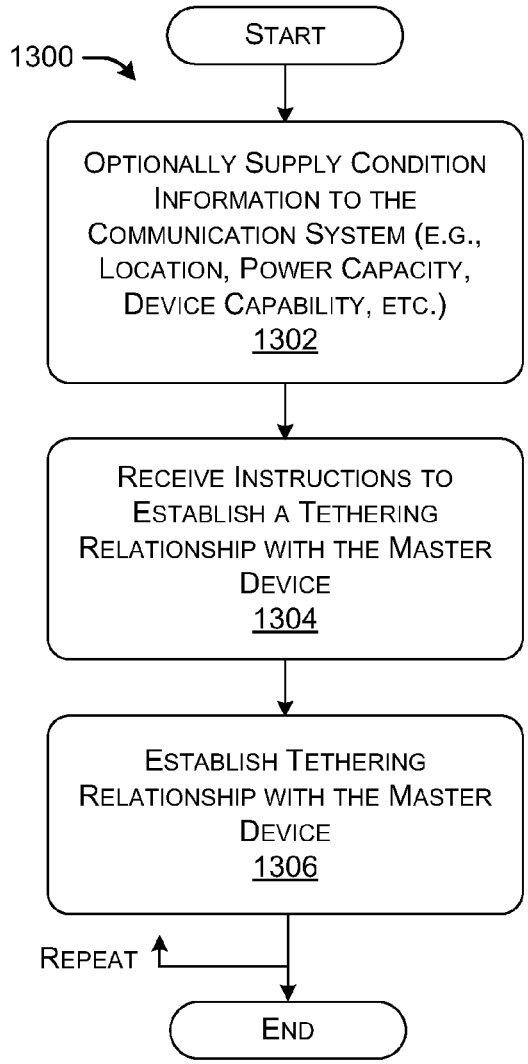
FIG. 12
FIG. 13

ENABLING PLURAL COMPUTING DEVICES TO COMMUNICATE USING A MASTER ACCOUNT

BACKGROUND

Many computing devices now accommodate some form of wireless communication functionality. Common examples of such wireless-enabled devices include laptop-type computers of various sizes and feature sets, mobile telephones, personal digital assistant (PDA) devices, tablet-type computing devices, book reader devices, and so on. In view of the success of these wireless-enabled devices in the marketplace, the industry can be expected to offer additional types of wireless-enabled devices in the future.

Some manufacturers have attempted to consolidate many different functions into a single wireless-enabled device. Yet, at present, many users own two or more distinct wireless-enabled devices. Furthermore, many users routinely carry and utilize plural wireless-enabled devices. For example, a user who departs for a business trip may bring along a mobile telephone, a tablet-type device, and a laptop computer. Each of these devices may fulfill a slightly different purpose over the course of the trip.

A user who purchases a wireless-enabled device is typically expected to enter into a contractual obligation with a communications operator. For example, a user who owns a mobile telephone and a wireless modem card (for use, for example, in conjunction with a laptop computer) may sign up for two separate accounts with one or more communications operators. The account associated with the mobile telephone may entitle the user to talk for a prescribed number of minutes in a billing cycle. The account associated with the wireless modem card may allow the user to consume a prescribed volume of content during the billing cycle, and so forth. In addition, or alternatively, an account may allow the user to obtain information at a prescribed maximum bandwidth, and so on.

The above-described arrangement is not fully satisfactory, for illustrative reasons set forth in greater detail herein.

SUMMARY

Functionality is described that allows plural computing devices to share a master account. The master account defines an amount of available communication resources that can be consumed by the plural computing devices. In a first implementation, the functionality allows any candidate device to directly communicate with a communication system using the master account, providing that the candidate device satisfies a prescribed condition with respect to a master device. For example, the functionality can allow the candidate device to communicate with the communication system if it is within a threshold distance of the master device.

In a second implementation, functionality is described that again allows plural computing devices to share a master account. In this case, the functionality instructs the master device and the candidate device to set up a tethering relationship if these devices satisfy a prescribed condition. The functionality can then allow the candidate (slave) device to communicate with the communication system, via the master device, using the master account. In one implementation, the functionality can set up the tethering relationship without any involvement of the user (or users) who operate the master device and candidate device, or without substantial involvement.

In either implementation, the functionality can prepare and forward billing information to an account holder which describes the utilization of communication resources by the plural computing devices.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 12 is a flowchart that describes one illustrative manner of operation of a master device in the environment of FIG. 8.

FIG. 13 is a flowchart that describes one illustrative manner of operation of a candidate (slave) device in the environment of FIG. 8.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality that enables plural computing devices to share a master account according to a first implementation. In this case, any candidate device is permitted to directly interact with a communication system if it satisfies a prescribed condition with respect to a master device. Section B describes illustrative functionality that enables plural computing devices to share a master account according to a second implementation. Here, any candidate (slave) device is permitted to communicate with a communication system via a tethering relationship with a master device, providing that it satisfies a prescribed condition with respect to the master device. Section C describes illustrative processing functionality that can be used to implement any aspect of the features described in Sections A and B.

Figure 15:
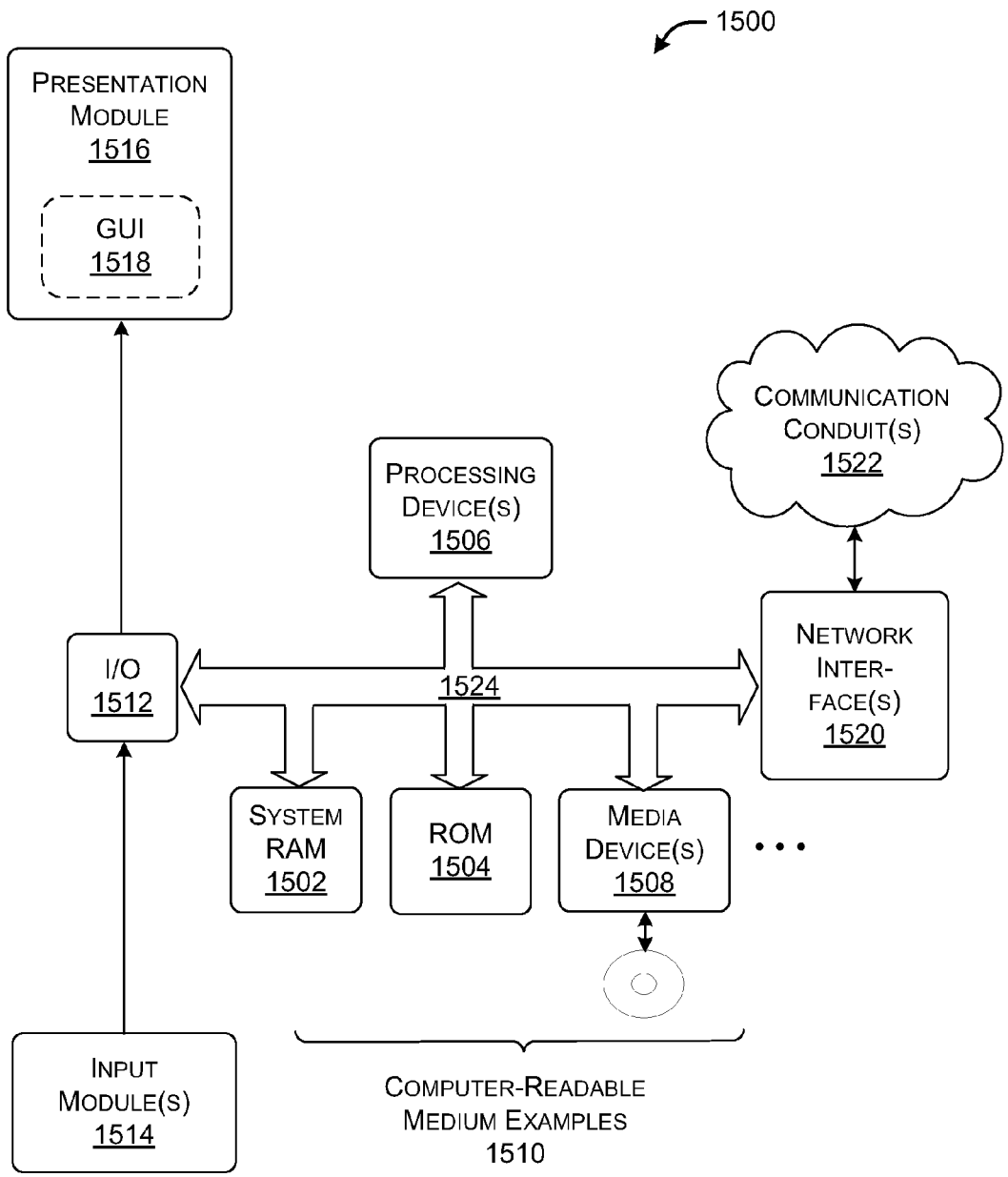
FIG. 15 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 15, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. First Implementation

Figure 1:
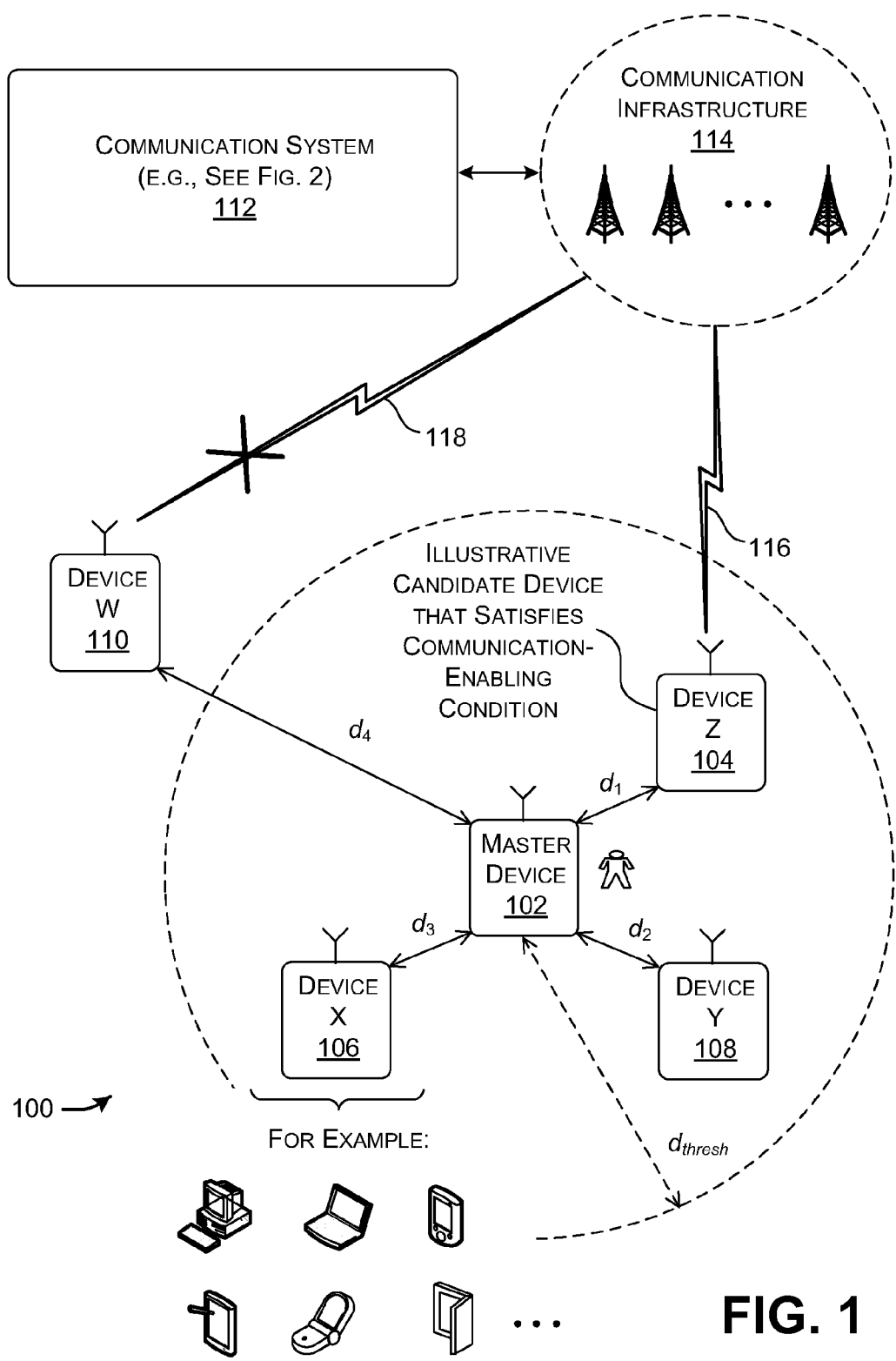
FIG. 1 shows a first environment that allows plural computing devices to share a master account having a prescribed consumption quota associated therewith.

FIG. 1 shows an environment 100 in which plural computing devices (e.g., computing devices 102, 104, 106, 108, 110) can share a master account when interacting with a communication system 112. That is, each computing device can interact with the communication system 112 based on terms specified in the master account. Among other conditions, the master account may specify a quota of communication resources that can be consumed by the pool of computing devices (102, 104, 106, 108, 110) within a billing cycle or other consumption period. As a result of this arrangement, a user who owns plural computing devices is not required to set up (and pay for) separate per-device accounts which govern interaction with the communication system 112. This section (Section A) sets forth a first approach for implementing shared account functionality. The next section (Section B) sets forth a second approach for implementing shared account functionality.

The communication system 112 may correspond to data processing functionality for interacting with the plural computing devices via wireless communication. For example, the communication system 112 may correspond to one or more server computers, one or more data stores, routing functionality, and so on. In one case, the communication system 112 may be administered by a communication operator. Although not shown, in another case, the environment 100 can provide plural communication systems that are optionally administered by plural respective communication operators.

The communication system 112 can provide its services in conjunction with communication infrastructure 114. For example, the communication infrastructure 114 can include a plurality of cell towers provided at different geographic locations, a plurality of base stations, one or more central switching stations, and so on. Alternatively, or in addition, the communication infrastructure 114 can include satellite communication functionality.

Each of the computing devices (e.g., computing devices 102, 104, 106, 108, 110) can comprise any type of processing device that includes the ability to engage in wireless communication with the communication system 112. Many of the computing devices may correspond to handheld or otherwise mobile computing devices. Such computing devices include, without limitation, laptop-type devices of various sizes and features sets, personal digital assistance (PDA) devices, book reader devices, tablet-type devices, handheld game devices, media player devices, medical equipment devices, and so on. In addition, the computing devices can include traditionally stationary devices, such as personal computing devices, workstation devices, game console devices, set-top box devices, and so on.

In example of FIG. 1, assume that the communication system 112 has, in advance, designated one of the computing devices as a master device (based on any criterion or criteria to be described below). In this particular example, the communication system 112 has designated the computing device 102 as the master device. Henceforth, for brevity, the computing device 102 will be referred to as the master device 102. In one implementation, the communication system 112 may treat the master device 102 in a privileged manner, allowing it to interact with the communication system 112 based on the terms specified in the master account, regardless of the location of the master device 102 (so long as the master device 102 is physically able to communicate with the communication system 112 via wireless communication). However, this rule can be varied in different ways, to be described below.

After designating the master device 102, the communication system 112 then performs analysis to determine whether any other computing device is permitted to interact with the communication system 112 using the master account. For purposes of explanation, each computing device that is a candidate for such communication is referred to as a candidate device. More specifically, the communication system 112 seeks to determine whether each of candidate devices X (106), Y (108), Z (104), and W (110) are permitted to interact the communication system 112 at a particular instance of time.

Consider the illustrative case of candidate device Z (104). To determine if the candidate device Z 104 is permitted to communicate with the communication system 112, the communication system 112 first receives condition information. The condition information describes a prescribed relation of the candidate device Z 104 to the master device 102. For example, the communication system 112 can receive an indication of the distance ($d_1$) of the candidate device Z from the master device 102. The communication system 112 then determines, based on the condition information, whether a communication-enabling condition is met. For example, the communication system 112 determines whether the distance $d_1$ between the candidate device Z 104 and the master device 102 is less than a prescribed threshold distance ($d_{thresh}$). If this condition is met, then the communication system 112 enables the candidate device Z (104) to directly communicate with the communication system 112 under the terms of the master account. FIG. 1 illustrates this communication by the wireless communication symbol 116. Note that candidate device X (106) and candidate device Y (108) are also within the prescribed threshold distance from the master device 102. Therefore, in one implementation, the communication system 112 permits these devices to also directly interact with the communication system 112.

In contrast, consider the illustrative case of candidate device W (110). This candidate device is separated from the master device 102 by more than the threshold distance ($d_{thresh}$). Hence, the communication system 112 may preclude this candidate device from directly interacting with the communication system 112 using the master account. FIG. 1 illustrates this disabled communication by the wireless communication symbol 118.

According to one illustrative implementation, the functionality which enables the environment 100 to operate in the manner described above is embodied in the communication system 112. Hence, in this implementation, any "off-the-shelf" computing device can participate in the account-sharing approach shown in FIG. 1, without modification. As another potential benefit of this implementation, the communication system 112 can maintain control over use of its communication resources by plural computing devices associated with a master account, and thereby potentially lower the risk of unauthorized use of the communication resources.

Figure 2:
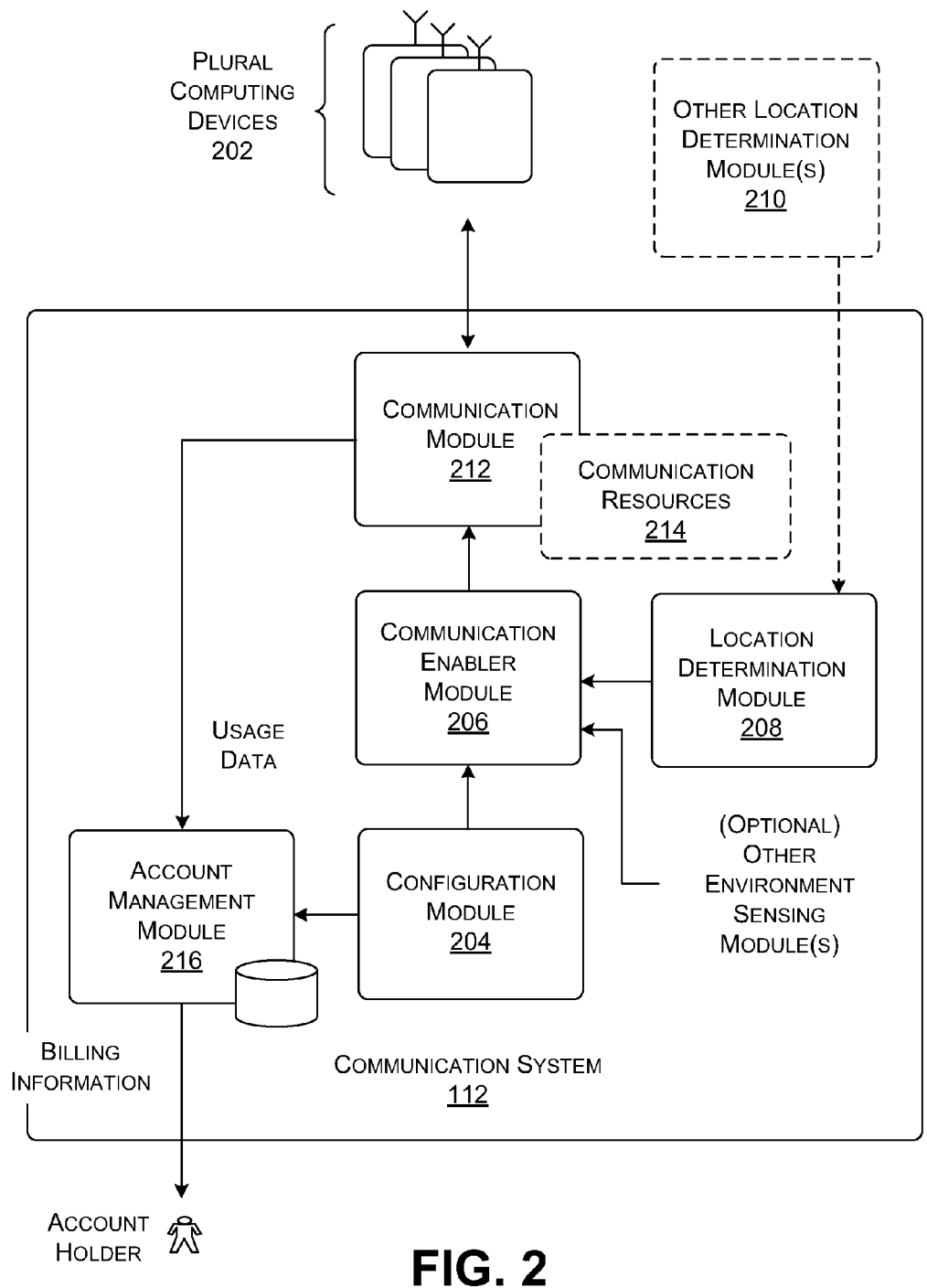
FIG. 2 shows an illustrative communication system for use in the environment of FIG. 1

FIG. 2 shows one illustrative implementation of the communication system 112 of FIG. 1. The functionality shown in FIG. 2 can be implemented by one or more server computers (or other processing functionality), in conjunction with one or more data stores, routing functionality, etc. FIG. 2 indicates that the communication system 112 is in potential communication with plural computing devices 202, which may correspond to any of the computing devices (102, 104, 106, 108, 110) shown in FIG. 1.

The communication system 112 can include a configuration module 204. The configuration module 204 sets up the communication system 112 to provide service to the plural computing devices 202 using a single master account. In one case, the configuration module 204 can receive configuration information that is manually supplied. For example, the configuration module 204 can receive such configuration information from a human administrator associated with the communication system 112 and/or an end user. For example, the configuration module 204 may provide a network-accessible configuration page that allows the administrator or end user to enter the configuration information, and to later modify the configuration information.

The configuration information may specify the members of a collection of devices that are permitted to use the master account. The configuration information may also optionally identify the computing device that is to serve the role of the master device (e.g., the master device 102 shown in FIG. 1). For example, consider the user who owns a mobile telephone device, an ebook reader device, and a wireless modem for use with a laptop computer. The user may access the configuration module 204 to identify these three devices as members of a group that are permitted to use the same master account. That user may also designate the mobile telephone device as the master device. The user can select the master device based on any consideration or combination of considerations. For example, the user may designate the mobile telephone device as the master device because that is the device which she carries and uses most often; the other devices may serve more of a peripheral role in her daily routine. The configuration module 204 may allow the user to subsequently change the designation of the master device. However, in one implementation, the configuration module 204 may enforce rules which restrict how often the user is allowed to modify the configuration information. In addition, the configuration module 204 may enforce rules which limit the user's choice of the master device based on any consideration(s).

Alternatively, or in addition, the configuration module 204 can automatically select or recommend a master device based on an assessment of suitability of the master device, based, in turn, on any criterion or criteria. For example, each computing device can forward condition information to the configuration module 204 which describes its capabilities. For example, each computing device can describe the type of resources which it provides, including its wireless communication functionality, memory resources, processing resources, power source(s), etc. The configuration module 204 also has independent access to usage information which indicates the manner in which the end user has used a computing device on past occasions. Based on all or some of these factors, the configuration module 204 can then select a computing device which is deemed a suitable candidate for performing the functions of the master device. For example, the configuration module 204 can select a computing device that has the greatest power capacity, or the most advanced wireless communication resources, or the most memory, etc., or any combination of these factors. Alternatively, or in addition, the configuration module 204 can select the computing device which the user seems to use most often.

In another implementation, the configuration module 204 can select plural master devices. The configuration module 204 can select these master devices based on manual selections made by a user and/or based on analysis of condition information in the manner described above.

The communication system 112 can also include a communication enabler module 206. The communication enabler module 206 performs analysis to determine whether each particular computing device, at each particular time instance, is permitted to interact with the communication system 112 using the master account. According to one implementation, the communication enabler module 206 allows the master device to interact with the communication system 112 without restriction, or with reduced restrictions compared to the candidate devices.

On the other hand, the communication enabler module 206 performs per-device analysis to determine whether each candidate device is permitted to interact with the communication system 112 at each particular instance of time. To this end, the communication enabler module 206 can receive condition information from one or more environment sensing modules. Generally stated, the environment sensing modules determine the current relation of the candidate device under consideration to the master device.

For example, one such environment sensing module is a location determination module 208. The location determination module 208 determines the location of the candidate device and the location of the master device. The communication enabler module 206 uses this location information to determine the distance between the candidate device and the master device, and to determine whether this distance is less than the threshold distance ($d_{thresh}$).

The location determination module 208 can use any technique or combination of techniques to determine the location of a computing device. In one case, the location determination module 208 can use GPS functionality to determine the location. In another case, the location determination module 208 can use a cell tower triangulation functionality to determine the location of the computing device. In another case, the location determination module 208 can determine the location of the computing device based on its connection to (and hence, its proximity to) a Wi-Fi (IEEE 802.11) access point (or points), and so on. In one case, each user can be permitted to expressly opt in to (or opt out of) the collection of location information in the manner described above. Further, the communication system 112 can provide appropriate security provisions to maintain the collected location information in confidence.

Alternatively, or in addition, the location determination module 208 can provide condition information which more directly indicates the location of the candidate device relative to the master device. For example, the location determination module 208 can determine that two computing devices are suitably close together if they are both using the same cell tower. In another case, the location determination module 208 can determine that two computing devices are close together if they can communicate with each other in any manner, e.g., using Wi-Fi (IEEE 802.11) signaling, Bluetooth (IEEE 802.15) signaling, etc. Or the location determination module 208 can determine that two computing devices are close together if one device can read an RFID tag provided by another device, and so on.

In addition, or alternatively, the communication enabler module 206 can base its communication-enabling decisions on other condition information (e.g., besides or in addition to the location information). For example, the communication enabler module 206 can apply usage-based conditional rules to determine whether a candidate device is permitted to interact with the communication system 112. For example, the communication enabler module 206 can permit a candidate device to interact with the communication system 112 providing that the master device is not being used, or providing that the master device is consuming less than a threshold amount of bandwidth, or providing that the candidate device is expected to consume less than a threshold amount of bandwidth, or providing that all operational computing devices are expected to consume less than a total threshold amount of bandwidth, and so on.

FIG. 2 also shows a module 210 with the caption "other location determination module(s)," with a dashed-line border. This indicates that any functionality that is outside the domain of the communication system 112 can also supply location information to the communication enabler module 206. For example, any computing device can make a determination of its absolute or relative location, and forward that location information to the communication enabler module 206. In addition, or alternatively, third-part functionality (such as GPS functionality) can forward location information to the communication enabler module 206. More generally stated, any condition information that is used by the communication enabler module 206 can originate from any source, including local source(s) and/or remote source(s) (with respect to the communication system 112).

Presume that the communication enabler module 206 permits one or more candidate devices to interact with the communication system 112. If so, a communication module 212 can proceed to interact with the enabled device(s) via wireless communication. In doing so, the candidate device(s) consume communication resources 214. The communication resources 214 can corresponds to any processing resources, bandwidth resources, storage resources, etc. used by the communication system 112 to provide its services.

The usage of communication resources 214 can be quantified in any manner. For example, the usage of communication resources 214 can be measured and expressed in terms of time (e.g., the amount of time during which communication resources are consumed), in terms of data volume (e.g., the amount of data that is exchanged in a given time), in terms of bandwidth or connection speed (e.g., the rate at which information is transferred), and so on. As used herein, the term usage data refers to any information that describes the usage of communication resources 214.

An account management module 216 compiles the usage data into billing information on an account-by-account basis. The account management module 216 then forwards the billing information to an account holder, requesting the account holder to pay for the resources that have been consumed.

FIGS. 3-6 describe the operation of the environment 100 of FIG. 1 and the communication system 112 of FIG. 2 in the form of flowcharts. Since the principles underpinning the environment 100 have already been described, certain features of the flowcharts will be described in summary fashion below.

Figure 3:
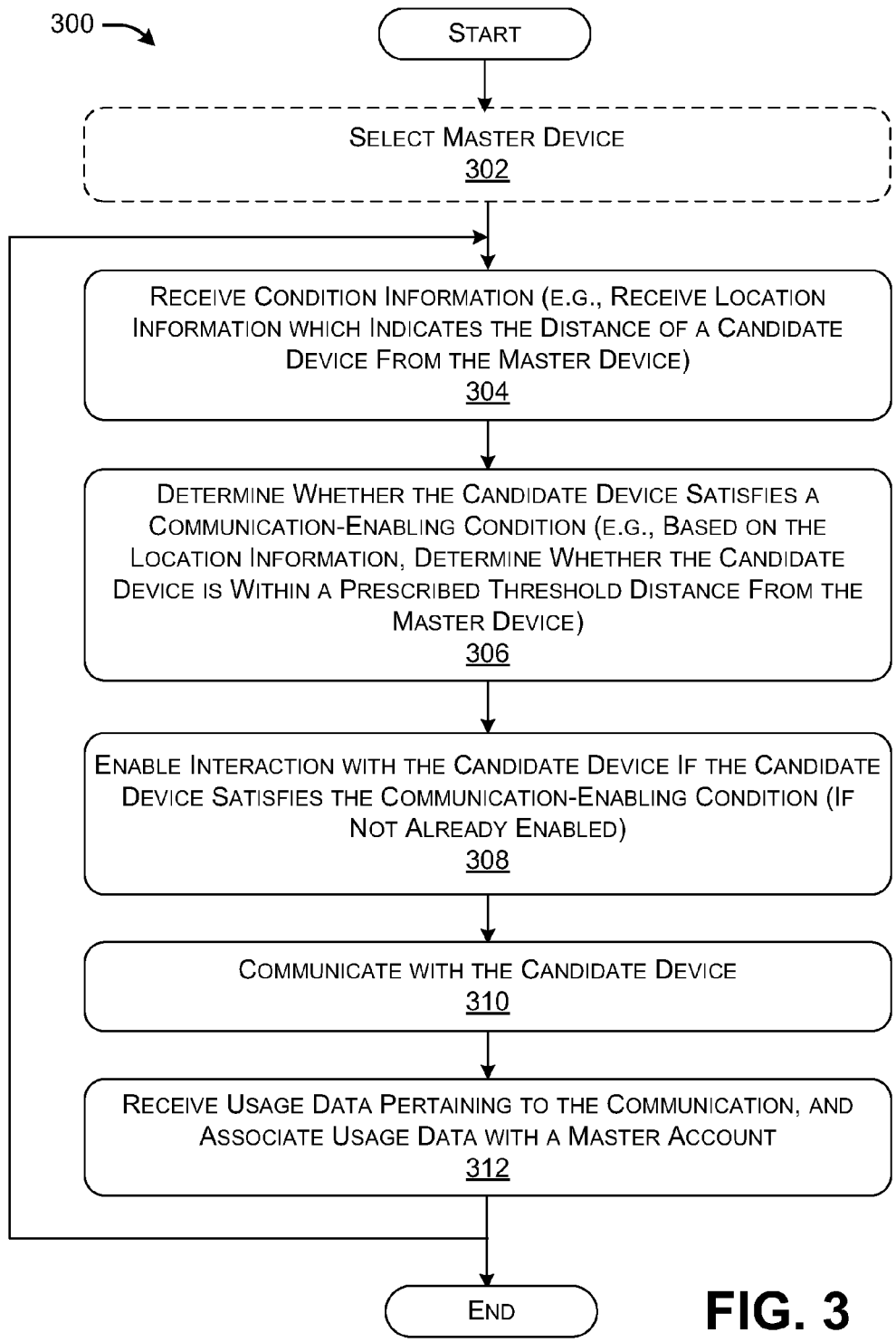
FIG. 3 is a flowchart that describes one illustrative manner of operation of the communication system of FIG. 2.

Starting with FIG. 3, this figure shows a procedure 300 that summarizes one manner of operation of the communication system 112 of FIG. 1. In block 302, the communication system 112 selects a master device according to any manual and/or automatic technique described above. In block 304, the communication system 112 receives condition information regarding an operating environment associated with a candidate device, such as candidate device Z 104. The condition information defines a current relation between the candidate device and the master device, such as a distance between these two devices. In block 306, the communication system 304 determines, based on the condition information, whether the candidate device satisfies a communication-enabling condition. In block 308, the communication system 112 enables the candidate device to engage in wireless communication with the communication system 112 if the candidate device satisfies the communication-enabling condition. In block 310, the communication system 112 interacts with the enabled candidate device, utilizing communication resources in the process. In block 312, the communication system 112 receives usage data pertaining to communication resources consumed by the candidate device in the course of said communicating. The communication system 112 then associates the usage data with a master account that applies to all of the plural computing devices.

Figure 4:
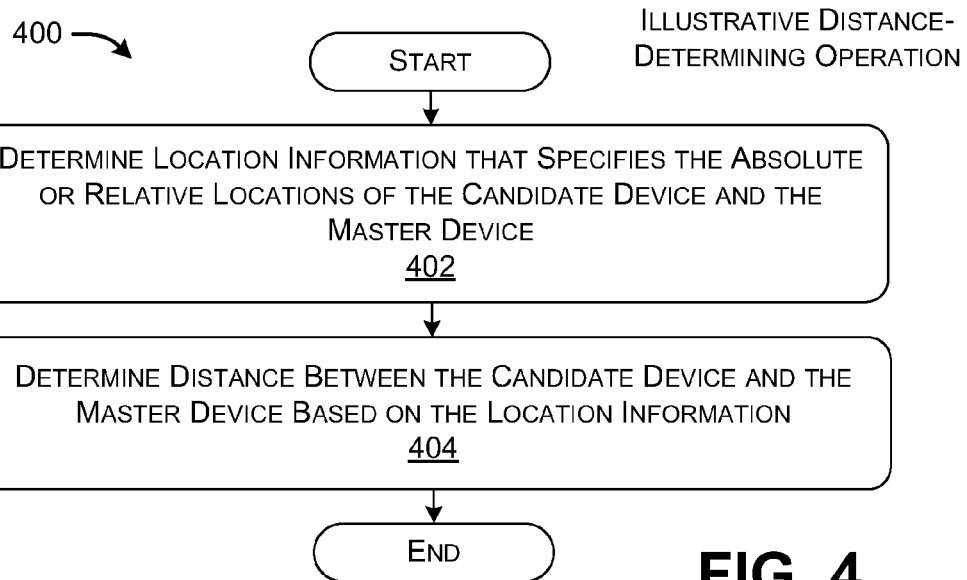
FIG. 4 is a flowchart that describes an illustrative manner of determining whether a prescribed condition is met, which enables a candidate device to use a master account.

FIG. 4 shows a procedure 400 whereby the communication system 112 determines whether or not to allow a candidate device to interact with the communication system 112. In block 402, the communication system 112 determines location information that specifies the locations of the candidate device and the master device. More specifically, the communication system 112 can determine the absolute locations of these devices and/or the location of the candidate device relative to the location of the master device. In block 404, the communication system 112 can determine the distance between the candidate device and the master device based on the location information collected in block 402. The communication system 112 can use this distance to determine whether the candidate device is permitted to interact with the communication system 112. As noted above, location information is one among many factors that the communication system 112 can use it making its communication-enablement decisions.

Figure 5:
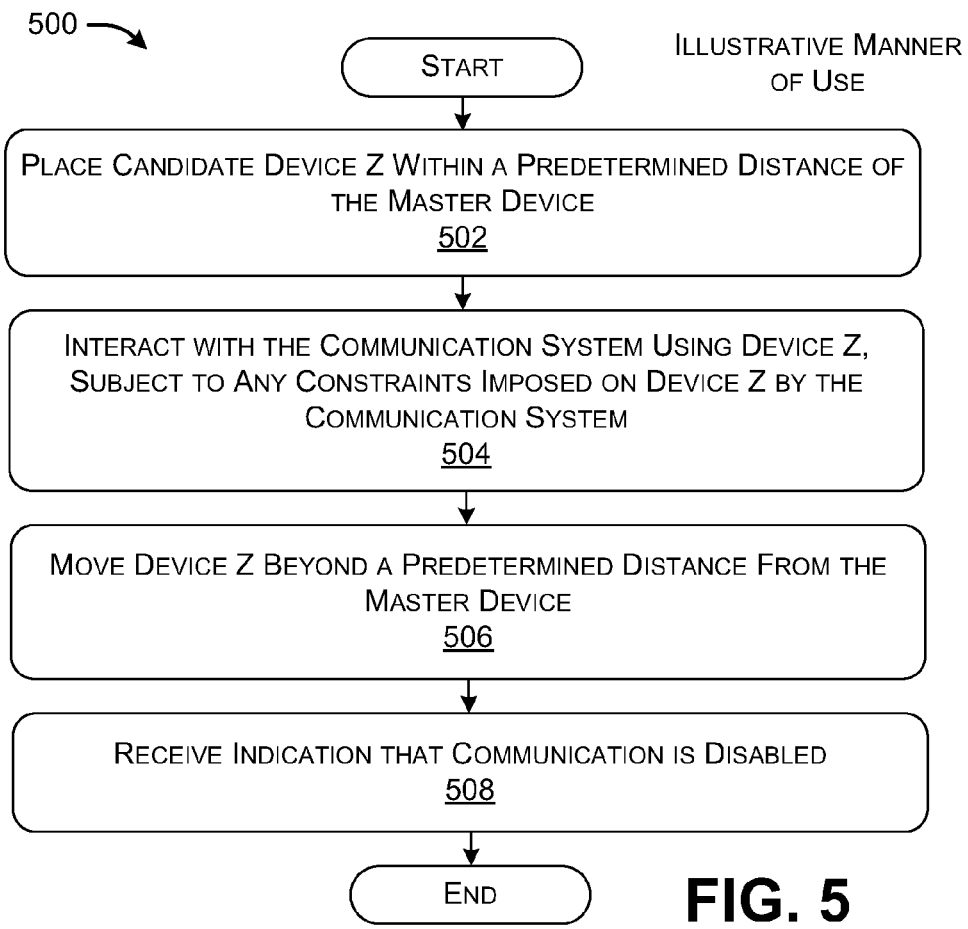
FIG. 5 is a flowchart that describes an illustrative manner of use of any computing device within the environment of FIG. 1.

FIG. 5 shows a procedure 500 that describes one manner in which a user may interact with the environment 100 shown in FIG. 1. In one case, the user can place a candidate device within a predetermined distance of a master device. For example, suppose that the user (or some other entity) has designated the master device as the user's mobile telephone device. To enable a book reader device to use the same master account as the mobile telephone device, the user may physically move the book reader device to within the threshold distance ($d_{thresh}$) of the mobile telephone device. In block 504, the user can then use the candidate device to interact with the communication system 112, using the master account.

In block 506, presume that the user now moves the candidate computing device beyond the prescribed threshold distance ($d_{thresh}$) from the master device. As a result, in block 508, the user can receive an indication that communication is now disabled (with respect to the master account). In one case, this indication may simply result from the user's observation that the candidate device is no longer connected to the communication system 112.

In the above explanation, it is assumed that a single user owns or otherwise controls the plural computing devices that share the same master account. This indeed represents one implementation. In another case, a group of users can own or otherwise control the plural computing devices. For example, a parent of a household can provide configuration information which establishes a sharing relationship among computing devices used by members of her family. However, to facilitate explanation, it will henceforth be assumed that a single user owns or otherwise controls the plural computing devices.

In any implementation, the communication system 112 can define different types of rules that govern the use of its communication resources by a user (or group of users). In one case, the communication system 112 may only permit one computing device to communicate at one time. In another case, the communication system 112 can permit two or more computing devices to communicate at the same type.

In any scenario, the terms of the master account can place usage-based restrictions on the singular or joint use of communication resources by one or more computing devices. In other words, the master account can place a quota on the amount of resources that can be consumed, quantified and expressed in any manner. The communication system 112 can enforce these limits. For example, the communication system 112 can place restrictions on the total amount of communication resources that can be consumed in a billing cycle. Such restrictions can be expressed in any manner, e.g., in terms of time, and/or volume of data, and so on. Alternatively, or in addition, the communication system 112 can specify restrictions on the total amount of communication resources that can be consumed in any time instance. The communication system 112 can express the per-instance consumption of these resources in any manner, e.g., in terms of consumed bandwidth. In these scenarios, any computing device that satisfies the communication-enabling condition(s) can communicate with the communication system 112 providing that such a use will not violate per-cycle usage limits and/or per-instance usage limits. Essentially, the communication system 112 treats any use of the communication resources in a device-agnostic manner, providing that, as said, any device that uses the communication resources satisfies the communication-enabling condition.

Alternatively, or in addition, the communication system 112 can place constraints that are particular to individual computing devices. For example, the communication system 112 can allow the master device to consume a first prescribed amount of communication resources; if another candidate device is allowed to communicate at the same time, the communication system 112 can allow that candidate device to consume a second prescribed amount of communication resources (where the second amount may differ from the first amount). In brief, the communication system 112 can be configured in different ways based on any business-related and/or technical-related consideration(s).

Figure 6:
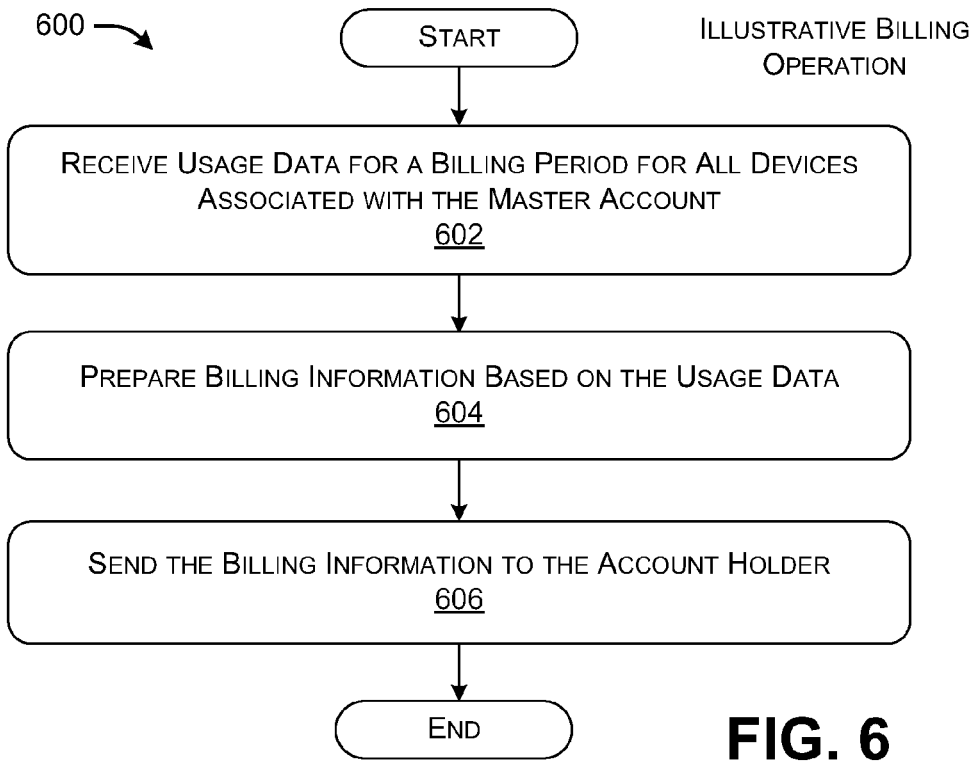
FIG. 6 is a flowchart that describes an illustrative manner of preparing and forwarding billing information using the communication system of FIG. 2.

FIG. 6 shows a procedure 600 that sets forth one manner by which the communication system 112 can generate and supply billing information. In block 602, the communication system 112 receives usage data for a particular account over the course of a billing period, such as a month. In block 604, the communication system 112 generates billing information for the account based on the usage data. In block 606, the communication system 112 sends the billing information to an account holder.

Figure 7:
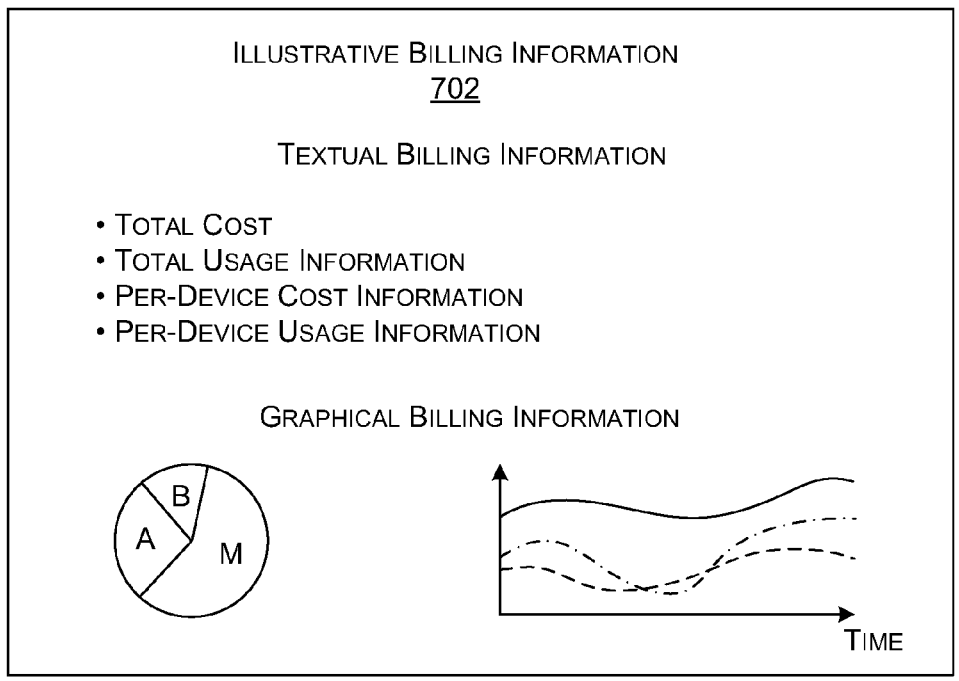
FIG. 7 shows illustrative billing information that can be prepared using the approach described in FIG. 6.

FIG. 7 provides high-level information regarding illustrative billing information 702. For example, the billing information 702 can provide an indication of the total usage and cost of resources consumed by the plural computing devices. In addition, the billing information 702 can break down the usage and cost information on a per-device basis. This enables the recipient user to gain insight regarding his or her usage habits over the course of the billing period. Based on this information, the user may decide to modify his or her usage habits. Alternatively, or in addition, the user may decide to change the configuration information in any way, such as by increasing or decreasing the resource limits, changing the master device, and so on. The billing information 702 can express the resources that were consumed in any manner, e.g., by providing textual billing information and/or graphical billing information and/or some other form of billing information.

Overall, the sharing of a master account by plural computing devices may afford one or more benefits. For example, the user may determine that it possible to save money by bundling the use of multiple devices into a single account. This is because the use of a single master account may reduce the number of administrative per-account charges.

In addition, the use a single master account may allow a user to more effectively and flexibly use up allocated communication resources. By contrast, with a per-device approach, the user may find that he or she is using only a fraction of the communication resources that he or she is asked to pay for on a periodic basis. This issue is particularly pronounced in those situations in which utilization of a computing device is uneven throughout a year or other time span. For example, consider the case in which the computer device is a camera that has wireless communication functionality. Further assume that a user primarily uses the camera while on vacation during the summer months. While the user may infrequently use the camera in the remainder of the year, in the per-device approach, the user will be asked to nevertheless pay a monthly fee to maintain the account in active status. By contrast, setting up a single master account that is shared by multiple computing devices (including the camera in this case) will allow the user to infrequently use any computing device without wasting communication resources for which he or she will be charged.

While the above approach enables the user to eliminate per-device accounts, the above approach can also be used in combination with per-device accounts. For example, the communication system 112 can be set up such that a candidate device is allowed to use a master account when the candidate device is within a predetermined distance of the master device. But that same candidate device may also be given the option of communicating using a separate account that is dedicated to that device. For example, the user may opt to use that per-device account when the candidate device is not in proximity to the master device.

B. Second Implementation

Figure 8:
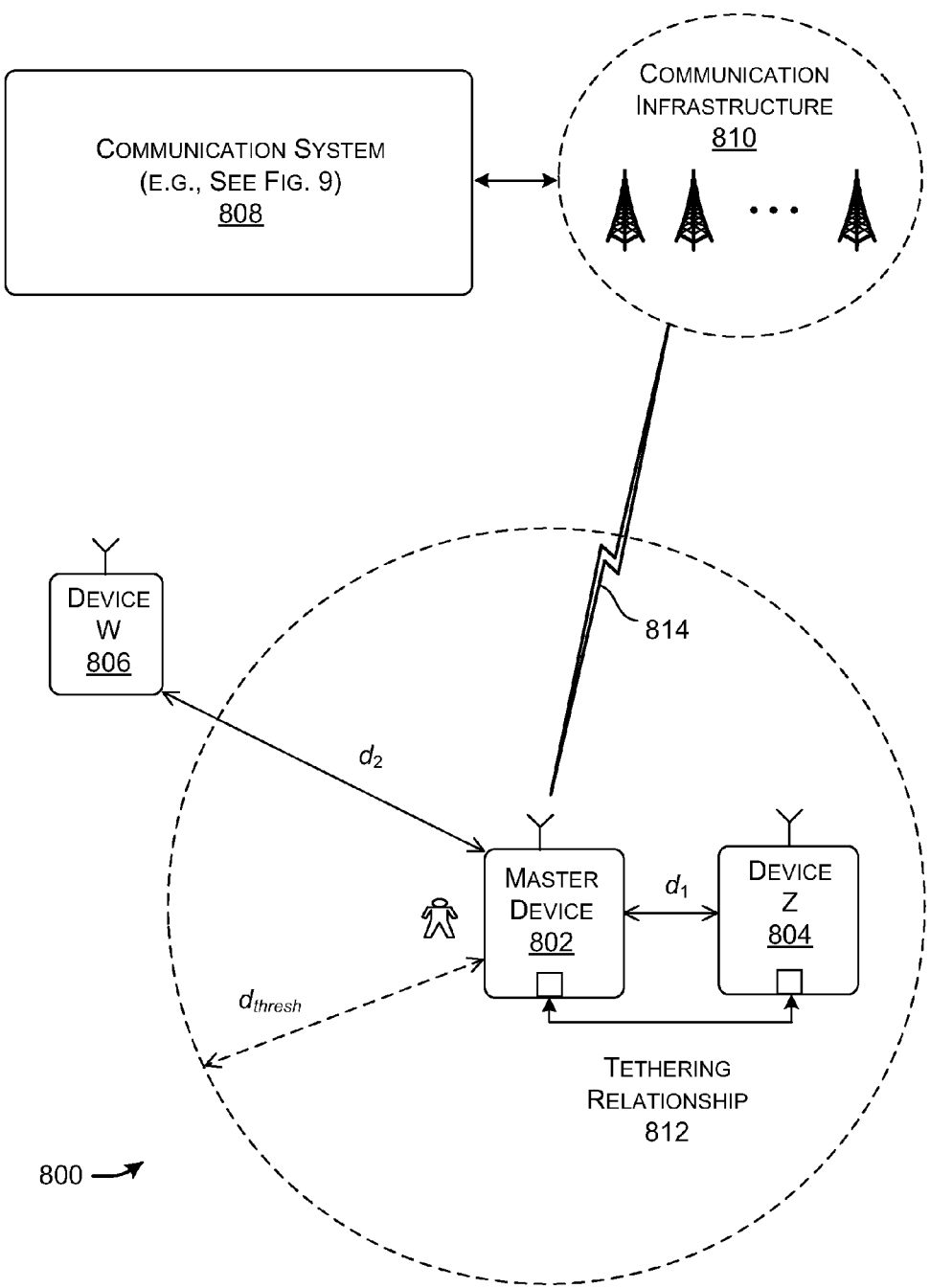
FIG. 8 shows a second environment that allows plural computing devices to share a master account; in this case, a candidate device uses the master account by establishing a tethering relationship with a master device.

FIG. 8 shows an environment 800 that provides a second implementation of the account-sharing paradigm. This environment 800 again includes a plurality of computing devices (e.g., 802, 804, 806) which communicate with a communication system 808, using associated communication infrastructure 810. This functionality can be implemented using the same type of equipment described above in Section A for the first implementation.

In this implementation, however, a candidate device 804 communicates with the communication system 808 by establishing a tethering relationship 812 with a master device 802. After this relationship is established, the master device 802 handles the interaction with the communication system 808, as indicated by communication symbol 814. In this role, the candidate device 804 functions as a slave device, and is henceforth referred to as a slave device.

Figure 9:
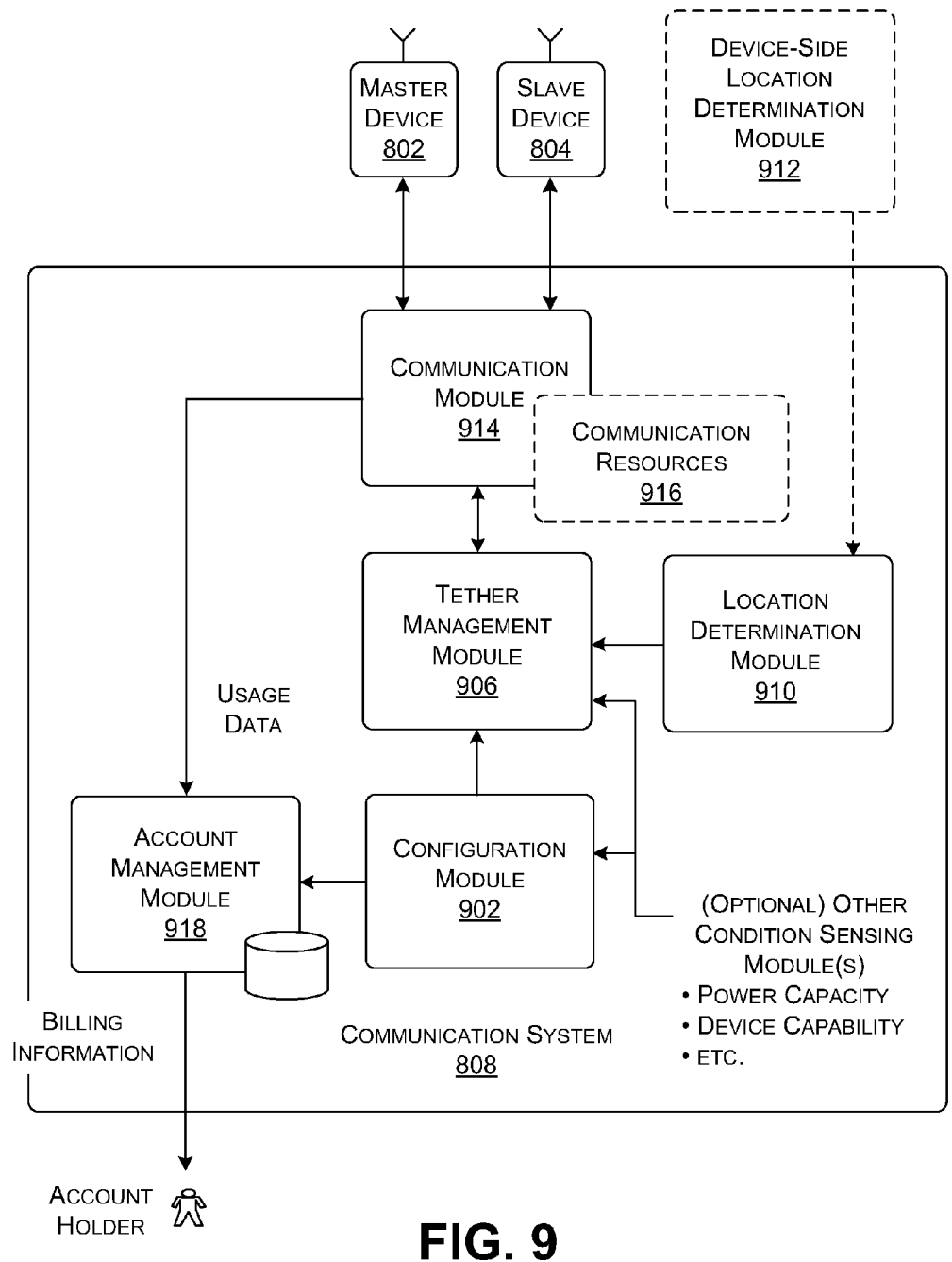
FIG. 9 shows an illustrative communication system for use in the environment of FIG. 8.

FIG. 9 shows one implementation of the communication system 808 of FIG. 8. As indicated, the communication system 808 can interact with both the master device 802 and the slave device 804. Although not shown, the communication system 808 can interact with additional computing devices. For example, the communication system 808 can set up plural tethering relationships between the master device 802 and plural candidate devices. Alternatively, or in addition, the communication system 808 can set up plural tethering relationships that involve plural master devices.

The communication system 808 includes a configuration module 902 that serves the same basic role as the configuration module 204 of Section A. Namely, the configuration module 902 can receive configuration information which defines the membership of a group of computing devices that are permitted to share a master account. The configuration module 902 can also receive configuration information which defines the master device, e.g., based on a manual selection by any user or agent. In addition, or alternatively, the configuration module 902 can receive condition information from the computing devices, such as device capability information, power capacity information, etc. Based thereon, the configuration module 902 can automatically select the master device. For example, the configuration module 902 can assign the role of master to the computing device that has the most robust communication resources, and/or the most effective power supply, and so on. Alternatively, or in addition, the configuration module 902 can assign the role of master to the computing device that is used most often by a user (which can be determined based on past usage information).

A tether management module 906 establishes a tethering relationship between two or more computing devices. As a first function, the tether management module 906 determines whether it is appropriate to set up such a tethering relationship between a master device and a candidate device under consideration. It performs this function based on condition information that it receives from environment sensing module(s). As in the first implementation, the condition information can correspond to any information which indicates a current relation between the candidate device and the master device. For example, the tether management module 906 can receive location information from a location determination module 910 (and/or an external location determination module 912). The location information describes, in either absolute or relative terms, the locations of the candidate device and the master device. The tether management module 906 can set up the tethering relationship if the candidate device is within a prescribed threshold distance ($d_{thresh}$) from the master device. The tethering management module 906 can consider yet other condition information in making its tethering decisions.

Having determined that it is appropriate to set up a tethering relationship, the tether management module 906 sends set-up instructions to both the master device and the candidate (slave) device. (Alternatively, or in addition, the master device can send a set-up instruction to the slave device.) The slave device and the master device then proceed to set up the tethering relationship. According to one implementation, the devices set up this relationship without any involvement of the user, or without substantial involvement.

Once the tethering relationship has been set up, a communication module 914 can interact with the slave device via the master device. The communication module 914 can also optionally conduct communication that is attributed to the master device per se. In performing communication, the communication system 808 consumes communication resources 916.

An account management module 918 receives usage data that indicates the resources consumed during a billing period. It then prepares and forwards billing information to the account holders as per the same procedure shown in FIG. 6. The billing information itself can provide the itemized information described in connection with FIG. 7.

Figure 10:
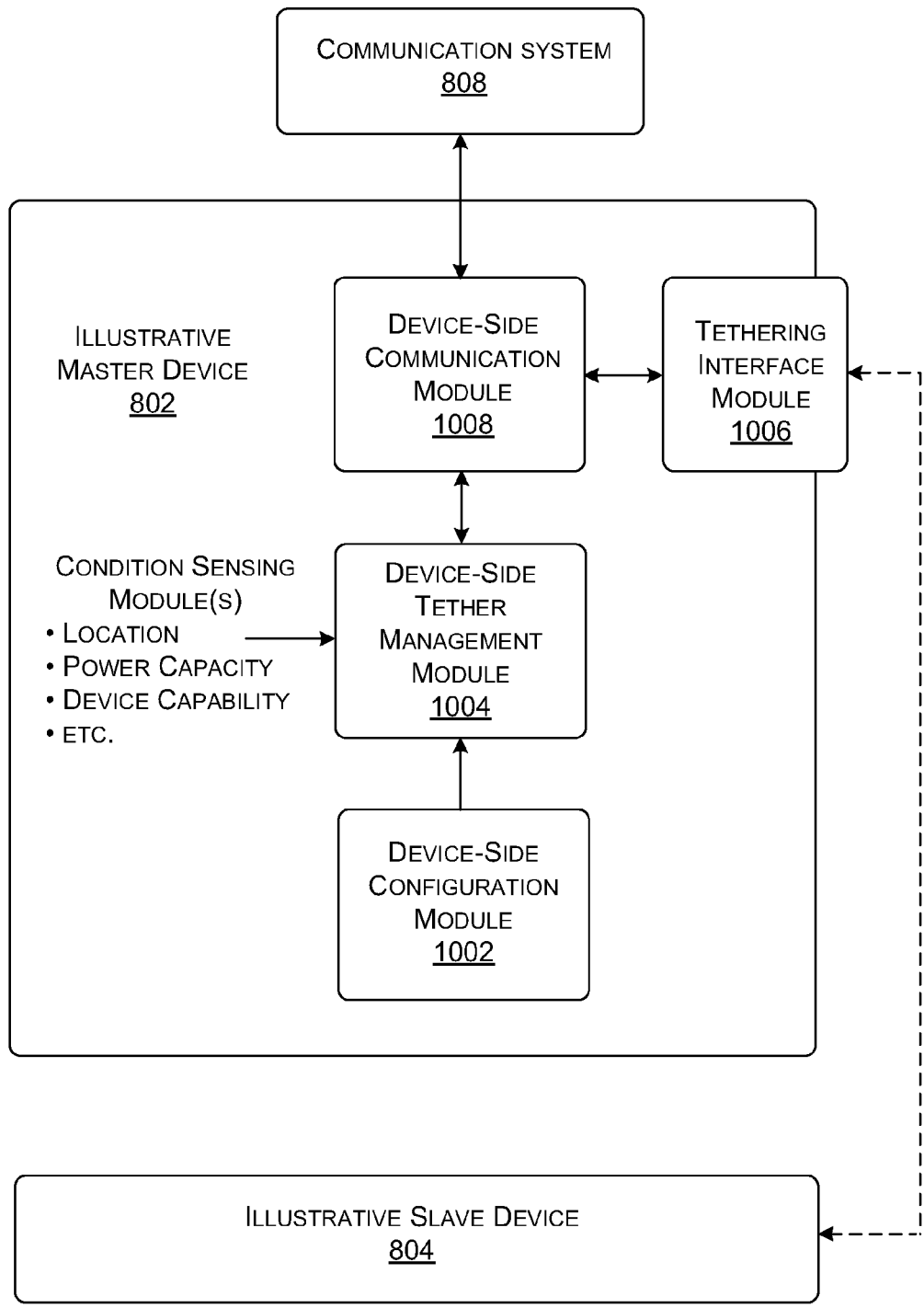
FIG. 10 shows illustrative functionality provided by a computing device for use in the environment of FIG. 8.

FIG. 10 shows illustrative functionality that can be provided by the master device 802. Although not shown, the slave device 804 can include the same functionality (e.g., insofar as the slave device 804 may, at another time, function as a master device, and the master device 802 may function as a slave device).

The master device 802 includes an optional device-side configuration module 1002. This module may represent any functionality for interacting with the system-side configuration module 902. For example, the user may use the device-side configuration module 1002 to designate the master device 802 as the device which is to assume the role of master. The user can also provide other configuration information via the device-side configuration module 1002.

A device-side tether management module 1004 receives instructions from the system-side tether management module 906. In response, the device-side tether management module 1004 establishes a tethering relationship with the slave device 804. (A counterpart tether management module provided by a slave device establishes a tethering relationship with the master device 802.) The tethering relationship can be established in any manner, such as by a wireless coupling mechanism (e.g., a Bluetooth or Wi-Fi mechanism, etc.), and/or a hardwired coupling mechanism (e.g., via a USB coupling mechanism, etc.). FIG. 10 shows that the master device 802 includes any type of tethering interface 1006 for establishing a tethering connection with a counterpart tethering interface module (not shown) of the slave device 804.

Finally, a device-side communication module 1008 communicates with the system-side communication module 914 once a tethering relationship has been established.

FIGS. 11-14 set forth the manner of operation of the environment 800 of FIG. 8 in flowchart form. Since the principle of operation of this functionality has already been set forth above, certain features are described in summary form below.

Figure 11:
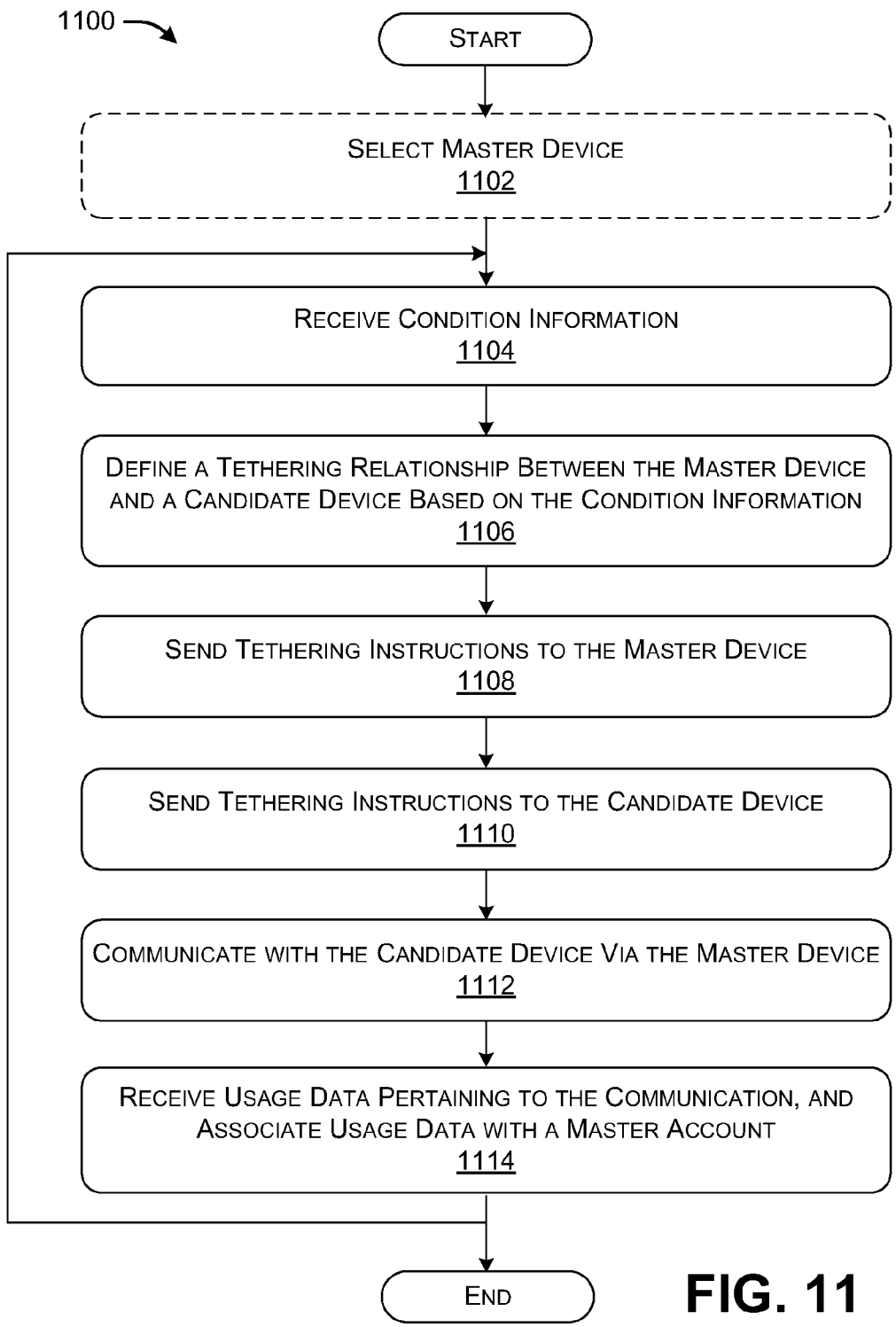
FIG. 11 is a flowchart that describes one illustrative manner of operation of the communication system of FIG. 8.

Starting with FIG. 11, this figure shows a procedure 1100 that explains the operation of the communication system 808 of FIG. 9. In block 1102, the communication system 808 selects the master device based on any criterion or criteria described above. More specifically, the communication system 808 can perform this task by querying the computing devices associated with a master account to collect condition information therefrom. Alternatively, or in addition, the computing devices can independently forward condition information to the communication system 808. The communication system 808 selects the master device based on the condition information. Alternatively, the communication system 808 can choose the master device based on a manual selection.

In block 1104, the communication system 808 may receive additional condition information. The condition information describes the relation of a candidate device with respect to the master device, such as the location of the candidate device relative to the master device. In block 1106, the communication system 808 defines a tethering relation between the candidate device and the master device if the condition information satisfies a communication-enabling condition. In block 1108, the communication system 808 sends instructions to the master device to set up the tethering relationship. In block 1110, the communication system 808 (and/or the master device) sends instructions to the candidate device to set up the tethering relation. In block 1112, the communication system 808 interacts with the candidate device via the master device using the tethering relationship. In block 1114, the communication system 112 receives usage data pertaining to the use of communication resources by the plural computing devices. The communication system 808 then prepares billing information and sends the billing information to an appropriate account holder.

FIG. 12 shows a procedure 1200 that explains one manner of operation of the master device 802. In block 1202, the master device 802 optionally provides condition information to the communication system 808, such as location information, device capability information, and power capacity information, etc. The communication system 808 uses this information to: a) determine which computing device is most appropriate to use as a master device; and b) then determine whether it is appropriate to set up a tethering relationship between the master device and a candidate device. In block 1204, the master device 802 receives instructions to set up a tethering relationship with the slave device 804, wherein the master device 802 is instructed to assume the role of master. In block 1206, the master device 802 establishes the tethering relationship as instructed. The master device 802 then interacts with the communication system 808, at the direction of the slave device 804.

FIG. 13 shows a procedure 1300 that explains one manner of operation of the slave device 804. In block 1302, the slave device 804 optionally provides condition information to the communication system 808, such as location information, device capability information, and power capacity information. This information serves the same use as set forth above with respect to FIG. 12. In block 1304, the slave device 804 receives instructions to set up a tethering relationship with the master device 802, wherein the slave device 804 is instructed to assume the role of slave. The instructions can originate from either the communication system 808 or the master device (or both). The instructions request the slave device to shut down any independent wireless connection it may have established. The instruction may also provide configuration information which enables the slave device to establish a tethering relationship with the particular type of master device that is being used. In block 1306, the slave device 804 establishes a tethering relationship as instructed. The slave device 804 then interacts with the communication system 808 via the connection established by the master device 802.

Figure 14:
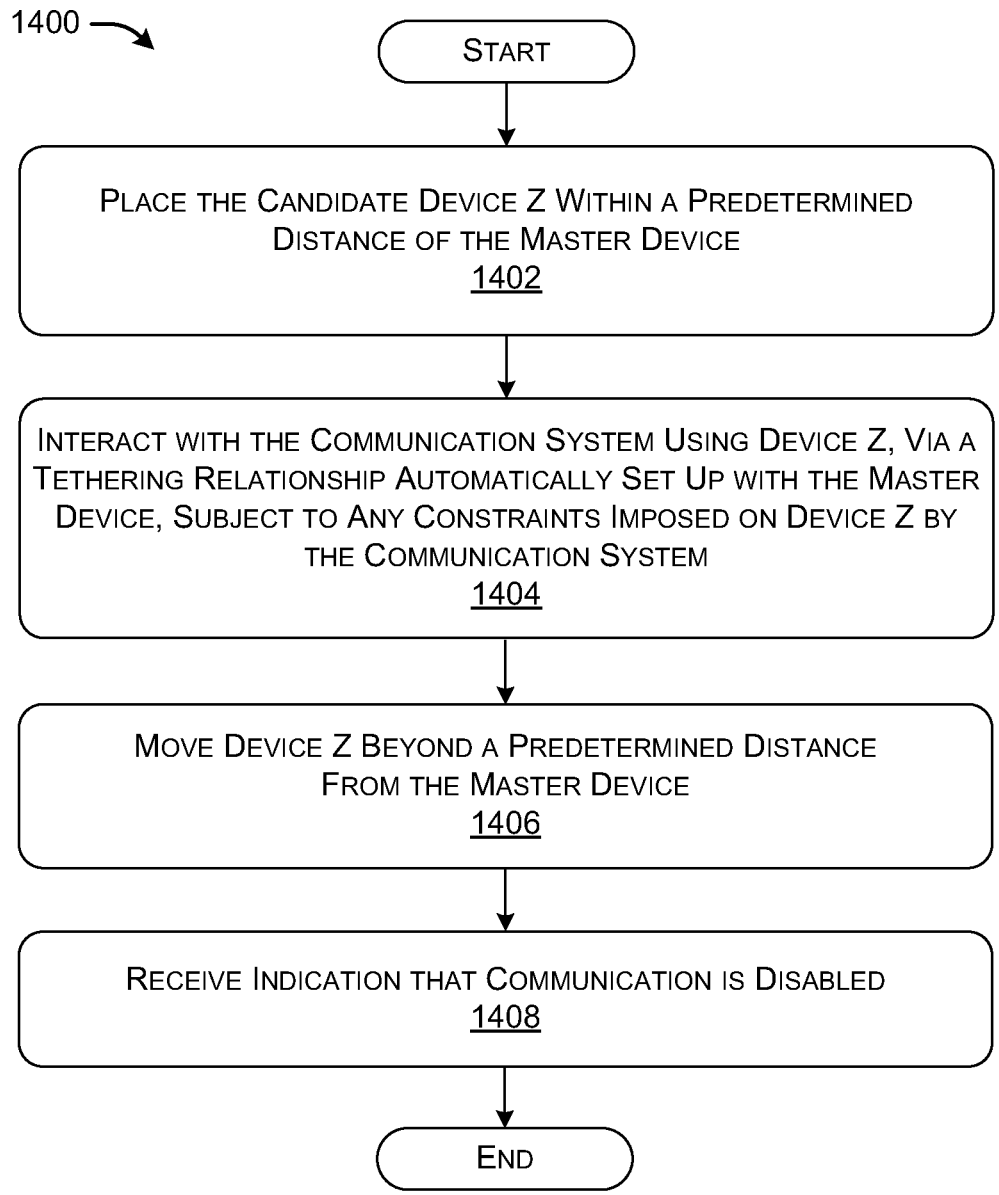
FIG. 14 is a flowchart that describes an illustrative manner of use of any computing device within the environment of FIG. 8.

FIG. 14 shows a procedure 1400 that sets forth one way in which a user may use the functionality shown in the environment 800 of FIG. 8. In block 1402, the user may place a candidate device within a threshold distance ($d_{thresh}$) of the master device. At this point, the communication system 808 automatically senses the proximity of these two devices and automatically (or at least partially automatically) sets up the tethering relationship between the two devices. That is, the user is not asked to expressly set up this relationship. In block 1404, the user then uses the slave device to interact with the communication system 808 via the master device. In block 1406, assume that the use next moves the slave device beyond the threshold distance ($d_{thresh}$) from the master device. In block 1408, the user receives an indication that the tethering relationship is not longer established. In one case, the user may receive such an indication by simply noting that he or she is no longer able to interact with the communication system 808.

The use of the communication system 808 to set up the tethering relationship has one or more benefits in illustrative embodiments. First, this provision simplifies the configuration of the tethering relationship from the perspective of the user. Second, by virtue of this provision, the communications operator can maintain control of the tethering relationship, and thereby reduce the risk of undesirable use of communication resources by computing devices.

More generally, the use of a tethering relationship may be deemed desirable in some implementations in order to reduce the impact of the plural computing devices on a wireless network. In addition, the tethering relationship may reduce the expenditure of power by the slave devices.

C. Representative Processing Functionality

FIG. 15 sets forth illustrative electrical data processing functionality 1500 that can be used to implement any aspect of the functions described above. The electrical data processing functionality 1500 represents a physical and tangible machine. For example, the processing functionality 1500 can be used to implement any aspect of the communication systems (112, 808) of the implementations of Sections A and B, and/or any aspect of the computing devices of the implementations of Sections A and B. In one case, the processing functionality 1500 may correspond to any type of processing device that includes one or more processing devices.

The processing functionality 1500 can include volatile and non-volatile memory, such as RAM 1502 and ROM 1504, as well as one or more processing devices 1506. The processing functionality 1500 also optionally includes various media devices 1508, such as a hard disk module, an optical disk module, and so forth. The processing functionality 1500 can perform various operations identified above when the processing device(s) 1506 executes instructions that are maintained by memory (e.g., RAM 1502, ROM 1504, or elsewhere).

More generally, instructions and other information can be stored on any computer readable medium 1510, including, but not limited to, static memory storage devices, magnetic storage devices, optical storage devices, and so on. The term computer readable medium also encompasses plural storage devices. In all cases, the computer readable medium 1510 represents some form of physical and tangible mechanism.

The processing functionality 1500 also includes an input/output module 1512 for receiving various inputs from a user (via input modules 1514), and for providing various outputs to the user (via output modules). One particular output mechanism may include a presentation module 1516 and an associated graphical user interface (GUI) 1518. The processing functionality 1500 can also include one or more network interfaces 1520 for exchanging data with other devices via one or more communication conduits 1522. The network interfaces 1520 can encompass wireless communication functionality for communicating with wireless communication infrastructure. One or more communication buses 1524 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a physical communication system, for interacting with plural computing devices, including at least a master device of a plurality of master devices and a candidate device, comprising:
   receiving condition information regarding an operating environment associated with the candidate device, the condition information defining a current relation between the candidate device and the plurality of master devices, the condition information including (i) an indication of a distance between the candidate device and the plurality of master devices and (ii) a bandwidth parameter relating to an amount of bandwidth that communication between the plurality of master devices and the candidate device would use;
   determining, based on the condition information, whether the candidate device and a master device of the plurality of master devices satisfies a communication-enabling condition;
   enabling the candidate device to engage in wireless communication with the communication system upon the candidate device satisfying the communication-enabling condition;
   once the candidate device is enabled, communicating with the candidate device via wireless communication based on usage terms specified in a master account, the master account governing interaction of all of the plural computing devices with the communication system;
   receiving usage data pertaining to communication resources that are consumed by the candidate device in the course of said communicating; and
   associating the usage data with the master account.

2. The method of claim 1, wherein the communication-enabling condition corresponds to an indication that the distance is less than a threshold distance.

3. The method of claim 2, further comprising determining the distance by:
   determining location information which indicates the absolute or relative locations of the master device and the candidate device; and
   determining a separation between the master device and the candidate device based on the location information, the separation corresponding to the distance.

4. The method of claim 2, further comprising preventing the candidate device from engaging in wireless communication, using the master account, if the distance is not less than the threshold distance.

5. The method of claim 1, further comprising selecting the master device among the plural computing devices based on at least one of:
   a manual selection of the master device; and
   an assessment of suitability of the master device.

6. The method of claim 1, wherein the master account specifies an amount of available communication resources which can be utilized by the plural computing devices.

7. The method of claim 1, wherein the master account is associated with a single user, and the plural computing devices are operated by the single user.

8. The method of claim 1, wherein the indication of a distance between the candidate device and the master device is based on whether the devices can read respective RFID tags on the devices.

9. The method of claim 1, wherein only one of the plural computing devices is permitted to communicate using the master account at any given time.

10. The method of claim 1, wherein at least a first computing device and a second computing device are permitted to communicate using the master account at any given time.

11. The method of claim 10, further comprising allocating a first amount of communication resources to the first computing device, and allocating a second amount of communication resources to the second computing device, wherein the first amount differs from the second amount.

12. The method of claim 1, wherein the master device is chosen from the plurality of master devices based on the combination of (i) a type of wireless communication available on the master device being a most advanced wireless communication type available; and (2) the amount of memory on the master device.

13. A method, performed by a physical communication system, for interacting with plural computing devices, including at least a master device of a plurality of master devices and a candidate device, comprising:
   receiving condition information;
   defining, based on the condition information, a tethering relationship between a master device of the plurality of master devices and the candidate device;
   sending instructions to the master device to set up the tethering relationship;
   sending instructions to the candidate device to set up the tethering relationship; and
   communicating with the candidate device via the master device, as per the tethering relationship,
   wherein the condition information includes (i) an indication of a distance between the candidate device and the master device and (ii) a bandwidth parameter relating to an amount of bandwidth that communication between the master device and the candidate device would use.

14. The method of claim 13, further comprising selecting the master device based on a manual selection of the master device.

15. The method of claim 13, further comprising selecting the master device based on an assessment of suitability of the master device.

16. The method of claim 15, wherein the master device is assessed as suitable based on a consideration of communication resources provided by the master device.

17. The method of claim 15, wherein the master device is assessed as suitable based on a consideration of power capacity provided by the master device.

18. The method of claim 13, wherein the condition information specifies a distance between the master device and the candidate device, and wherein the tethering relationship is defined provided that the distance is less than a prescribed threshold distance.

19. The method of claim 13, wherein said defining of the tethering relationship and said sending of instructions to the master device and the candidate device occurs without involvement of a user who is associated with master device and the candidate device.

20. The method of claim 13, further comprising:
receiving usage data pertaining to communication resources consumed by the candidate device in the course of said communicating; and
associating the usage data with a master account.

21. A computer readable memory for storing computer readable instructions, the computer readable instructions providing a communication system when executed by one or more processing devices, the computer readable instructions comprising:
a configuration module configured to recommend at least one master device based on an assessment of a suitability of the master device for performing master device tethering functions;
a communication enabler module configured to receive an indication of a distance between a master device and a candidate device, and to determine whether the distance is less than a threshold distance;
a communication module configured to communicate with the candidate device if the distance is less than the threshold distance; and
an account management module configured to receive usage data pertaining to communication resources consumed by the candidate device in the course of communicating, and to associate the usage data with a master account that applies to both the master device and the candidate device,
the master account specifying an amount of available communication resources which can be utilized by the master device and the candidate device,
wherein the configuration module has independent access to past usage information indicating a manner in which a user has used the candidate device in the past, and
wherein the assessment is based on (1) the past usage information and (2) condition information forwarded from the candidate device describing communications capabilities of the candidate device.

* * * * *